July 25, 1933.  A. P. BARNES  1,919,765
FRUIT HOLDER
Original Filed July 6, 1931    2 Sheets-Sheet 1

INVENTOR
ALVIN P. BARNES
BY
Reif & Braddock
ATTORNEY

INVENTOR
ALVIN P. BARNES
BY
ATTORNEY

Patented July 25, 1933

1,919,765

UNITED STATES PATENT OFFICE

ALVIN P. BARNES, OF MINNEAPOLIS, MINNESOTA, ASSIGNOR, BY DIRECT AND MESNE ASSIGNMENTS, OF ONE-THIRD TO H. W. GEHR, OF ANOKA, MINNESOTA, AND ONE-THIRD TO ISABELL HODGE BARNES, AND ONE-THIRD TO EARL C. FRIEL, BOTH OF MINNEAPOLIS, MINNESOTA

FRUIT HOLDER

Application filed July 6, 1931, Serial No. 548,897. Renewed July 30, 1932.

This invention relates to a fruit holder, and to such a holder adapted to hold various fruits while they are being eaten. It is well known that such fruits as grapefruit, cantaloupe, honeydew melon and others, are usually cut in half and a half of the fruit served to the patron. It has been necessary, heretofore, for the eater or patron to hold the fruit with one hand while he eats the meat thereof with a spoon or other implement held in the other hand. This results in the patron often getting his hand wet by the juice of the fruit and it often makes an awkward and unpleasant method of eating the fruit. It is therefore highly desirable to have a holder which will hold the fruit firmly in the desired position, so that a patron does not have to hold it while eating it. It is desirable in such a holder, to have means for holding the fruit positively so that the fruit cannot slide or tip due to the pressure of spooning the meat out of the rind.

It is an object of this invention, therefore to provide a fruit holder having simple and efficient means for positively engaging and holding the fruit firmly in position.

It is a further object of the invention to provide a holder comprising a receptacle adapted to receive fruit of various sizes and having on the wall thereof spaced means adapted to engage and bite into the fruit and against which the fruit is pressed and rotated to bring it into firm holding position.

It is still another object of the invention to provide such a holder comprising an inner and outer receptacle, the inner receptacle preferably being removable, and the outer receptacle extending beyond the sides of the inner receptacle, the inner receptacle having a plurality of spaced means on the wall thereof, preferably extending helically, with which the fruit is engaged.

It is still another object of the invention to provide a fruit holder comprising an outer receptacle, an inner and readily removable receptacle held therein, said inner receptacle adapted to receive fruit of various sizes and having spaced ribs on its inner surface extending helically for a short distance so that the fruit can be pressed against said ribs and turned to be held firmly in position, said inner receptacle preferably being expanded at its upper portion so as to hold ice or cooling medium for the fruit.

These and other objects and advantages of the invention will be fully set forth in the following description made in connection with the accompanying drawings, in which like reference characters refer to similar parts throughout the several views and in which:—

Figure 1:
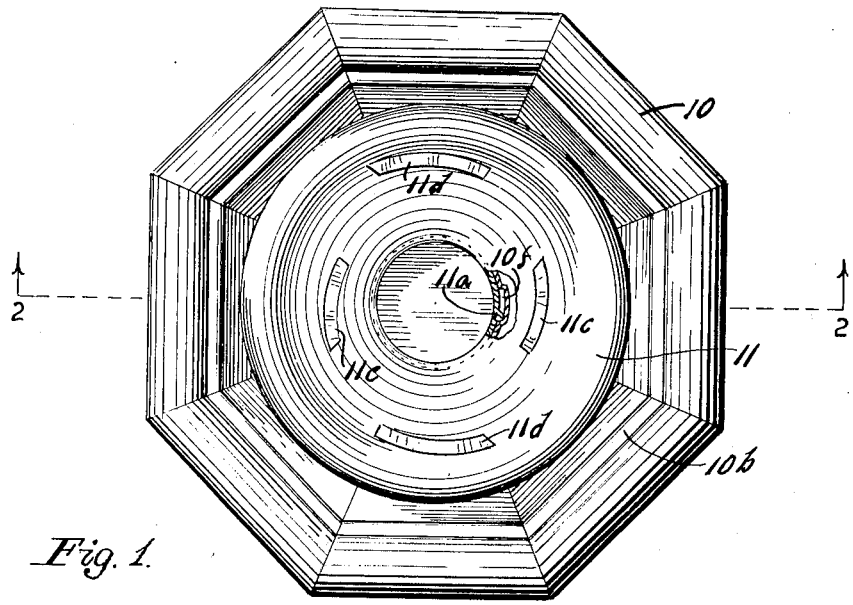
Fig. 1 is a plan view of one form of the invention showing a small portion broken away and other parts shown in horizontal section.

Referring to the drawings, particularly Figs. 1 to 4, a fruit holder is shown comprising an outer receptacle 10. While this receptacle may be variously formed, in the embodiment of the invention illustrated it is shown as of octagonal shape in plan and having its outer edge curved through substantially 180° to form an outer rim 10a. The rim portion 10a terminates at its inner side in a horizontal offset 10b and inside of the offset 10b vessel 10 has an annular trough 10c. Inside of the trough 10c is an annular rib 10d formed by an upward bend of substantially 180°, within which is a horizontal bottom portion 10e which is disposed somewhat above the bottom of the annular trough 10c. A central chamber is thus formed inside of the rib 10d and this chamber has in its opposite walls angle or bayonet slots 10f which may be formed by merely pressing the metal outwardly.

Within the vessel 10 is another receptacle or vessel 11, having a bottom portion substantially cylindrical in form, fitting within the central chamber of vessel 10 and having outwardly pressed projections 11a adjacent its bottom adapted to be received in the bayonet slots 10f. The bottom of vessel 11 substantially fits the central chamber in vessel 10, and the wall of vessel 11 extend outwardly and upwardly from rib 10d and is provided at its upper edge with an outwardly and downwardly turned rim 11b which is turned over substantially 180°. Vessel 11 has projecting inwardly from its wall at opposite sides thereof, a pair of rib 11c which extend only a portion of the way about said wall and extend helically about said wall. While these ribs may be variously formed, in the embodiment of the invention shown in Figs. 1 and 2, they are formed by pressing the wall of the vessel 11 inwardly to form a rib substantially V-shaped in cross section. Another pair of ribs 11d extend inwardly from the opposite sides of the vessel 11 some distance above the ribs 11c and spaced substantially 90° about the wall of the vessel therefrom.

Figures 2, 4, 5:
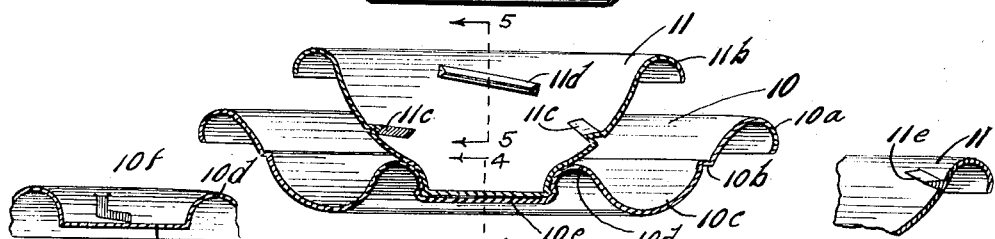
Fig. 2 is a vertical section taken on line 2—2 of Fig. 1 as indicated by the arrows.
Fig. 4 is a vertical section taken on line 4—4 of Fig. 2, as indicated by the arrows.
Fig. 5 is a partial section of the inner vessel showing a modified form.
Figure 3:
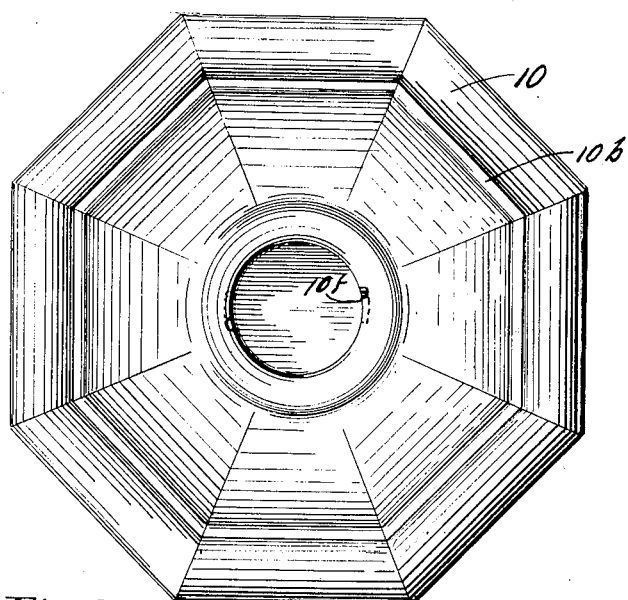
Fig. 3 is a plan view of the device shown in Fig. 1, with the inner receptacle removed.

The vessel 11 can be formed as shown in Fig. 5 and have a rib 11e thereon made from a separate piece of metal and which is substantially V-shaped in cross section. The rib 11e can be brazed, soldered, or otherwise secured to the wall of vessel 11 and extends helically thereabout the same as the ribs 11c and 11d.

Figure 6:
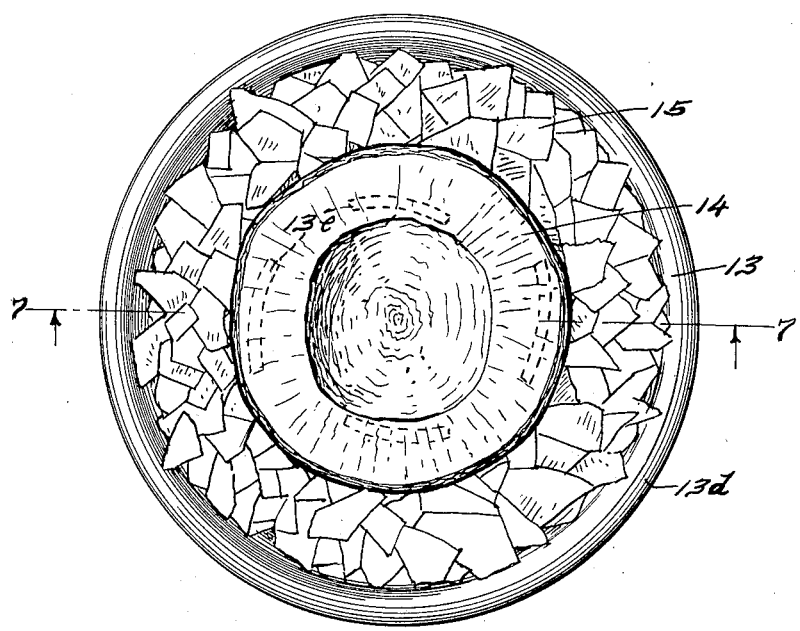
Fig. 6 is a plan view of a modification of the invention.
Figure 7:
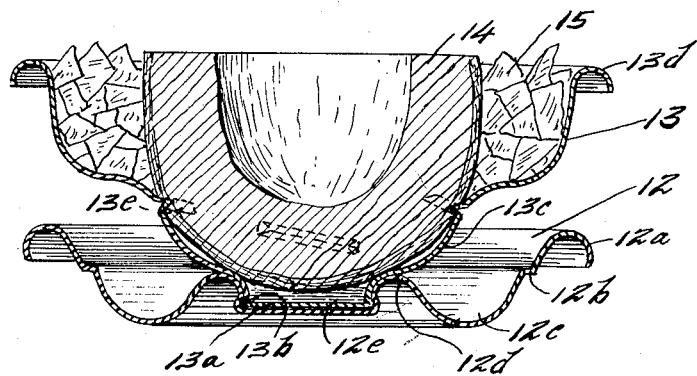
Fig. 7 is a vertical section taken on line 7—7 of Fig. 6, as indicated by the arrows.

In Figs. 6 and 7 a modified form of the invention is shown in which an outer vessel 12 is used having an outturned rim 12a similar to the rim 10a of the vessel 10 and having the vessel 12b similar to the offset 10b. The vessel 12, however, is shown as circular in form, instead of octagonal. The vessel 12 has an annular trough 12c, an annular rib 12d inside thereof, and a bottom portion 12e so that a central chamber is formed inside of the rib 12d, said chamber and rib 12d being the same in all respects as the rib 10d and the chamber therein, and will have angular or bayonet slots in the wall similar to the slots 10f already described. Another vessel 13 is disposed within vessel 12 and has a central bottom portion 13a cylindrical in form, similar to the bottom of the vessel 11, having projections 13b thereon adapted to fit into the slots in the central chamber of vessel 12. The bottom of vessel 13 fits snugly in the central chamber of the vessel 12 and the wall thereof extends outwardly and upwardly with a convex outer surface 13c above rib 12d, and the wall of the vessel then extends outwardly and upwardly in a compound curve and has a rim portion 13d at its upper end with the edge of the wall bent over substantially 180°. Vessel 13 has two pairs of ribs 13e on the inner side of its wall, the ribs of the pairs being oppositely disposed and being arranged substantially as are the ribs 11c and 11d and formed similarly thereto.

In the operation of the device, the piece of fruit such as a half-cantaloupe 14 as shown in Figs. 6 and 7, is disposed in the inner vessels 11 or 13 and pressed down into the bottom thereof so as to engage the ribs 11c or 11d or the ribs 13e respectively. If the fruit be smaller in diameter, it will engage securely the ribs 11c and if it be larger in diameter, it will more firmly engage the ribs 11d. The ribs 11c are therefore provided for engaging particularly a smaller fruit, while the ribs 11d are provided for engaging a larger fruit. After the fruit is pressed down into the vessel 11 or 13, it is given a partial rotation while still pressed downwardly and the ribs 11c, 11d or 13e bite into the fruit and the fruit is turned against the rib so that it is securely engaged thereby and held firmly in position. The fruit is so firmly held that it cannot be easily dislodged. The fruit is, of course, easily removed by simply giving it a reverse turn and lifting it from the inner receptacle. The device is adapted to handle practically all fruits and holds very firmly hard rind or hard surfaced fruit such as honeydew melons, smooth cantaloupe and similar fruits. The holder works perfectly with grapefruit, oranges, cantaloupe, honeydew melons and honeyboy melons. The holder can also be used for holding tomatoes or other vegetables which are often made into salads. The device, as stated, holds the fruit firmly as it is engaged on opposite sides, and yet there is no inward pressure to crush the fruit. A smooth surfaced melon is, as stated, firmly held and will not be oscillated or rotated by any pressure placed on the same while it is being eaten. In the form of the device shown in Figs. 6 and 7, crushed or broken ice 15 can be placed in the vessel 13 about the top of the fruit, so that it can be nicely cooled. If desired, ice can also be placed in the outer vessel about the inner vessel or receptacle. The inner vessel is easily removed for cleaning the device and another plain vessel, similar to the vessel 11 can be substituted for serving cereals or similar foods. A service such as given on dining cars can therefore have one set of outer vessels and two or more sets of inner vessels for serving different foods and can thus economize on space used to carry the dishes or vessels.

It will be seen that the inner vessel is first moved downwardly with the projections 11a in alinement with the vertical arm of the slots 10f and is then rotated slightly to bring the projections 11a into the slightly downwardly inclined arms of the slots 10f so that the inner vessel is drawn down firmly into position. The bottom of the inner vessel engaging snugly with the central chamber in the outer vessel causes it to be very firmly held in position.

From the above description it is seen that applicant has provided a very simple and efficient fruit holder. The holder is adapted to hold practically all types and sizes of fruit, including vegetables and has a large range of utility. By removing the inner vessel, as stated, the outer vessel can also be used with a cereal or other dish or vessel. The device can be made quite ornamental and handsome in appearance and preferably will be nicely plated. It forms a very ornamental and beautiful piece of tableware. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A fruit holder comprising a receptacle adapted to receive a fruit of general spherical or semi-spherical form, and having circumferentially spaced projections on its inner surface extending helically thereabout for engaging and holding a fruit pressed and rotated in engagement therewith.

2. A fruit holder comprising a receptacle of dish-like form adapted to receive a piece of fruit of general semi-spherical form and having a plurality of pairs of ribs extending partially about its inner wall in helical form and adapted to engage and hold a fruit which is pressed and rotated into engagement therewith.

3. A fruit holder comprising a receptacle of dish-like form having a bottom portion adapted to receive a piece of fruit of general semi-spherical shape and having spaced ribs at opposite sides pressed therefrom and projecting inwardly at its inner side, said ribs extending helically about said inner side for a short distance and adapted to engage and hold a fruit pressed and rotated thereagainst.

4. A fruit holder comprising a receptacle of dish-like form adapted to receive a piece of fruit of general semi-spherical form and having two pairs of ribs projecting inwardly from its inner wall, the ribs of each pair being disposed oppositely to each other and extending helically about said wall for a part of a revolution, and the ribs of one pair being spaced substantially 90° circumferentially from the ribs of the other pair.

5. The structure set forth in claim 4, one pair of ribs being disposed quite a distance nearer the top of the vessel than the other pair of ribs.

6. A fruit holder comprising a dish-like receptacle adapted to receive a piece of fruit of general semi-spherical form, said dish having circumferentially spaced ribs projecting inwardly from the wall thereof, said ribs being substantially V-shaped in cross section with their apices projecting inwardly.

7. A fruit holder comprising a receptacle having a dish-like bottom portion adapted to receive a piece of fruit of general semi-spherical form, said receptacle having a flared upper portion arranged to have its wall spaced from said fruit and adapted to receive ice, said receptacle having inwardly projecting helically extending means in said first mentioned portion adapted to engage and hold said piece of fruit.

8. A fruit holder comprising a receptacle of general dish-shape, adapted to receive a fruit of general part-spherical form, said receptacle having carried on and projecting from its inner surface circumferentially spaced edged means, said means extending circumferentially of said surface and each having one end thereof at a different height than its other end, whereby a fruit can be pressed thereagainst and rotated to engage said means therewith to hold said fruit firmly in said receptacle.

ALVIN P. BARNES.